United States Patent Office 3,725,230
Patented Apr. 3, 1973

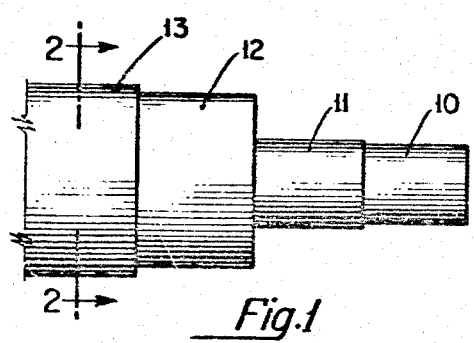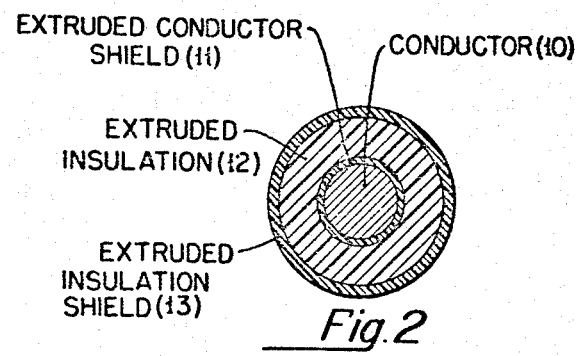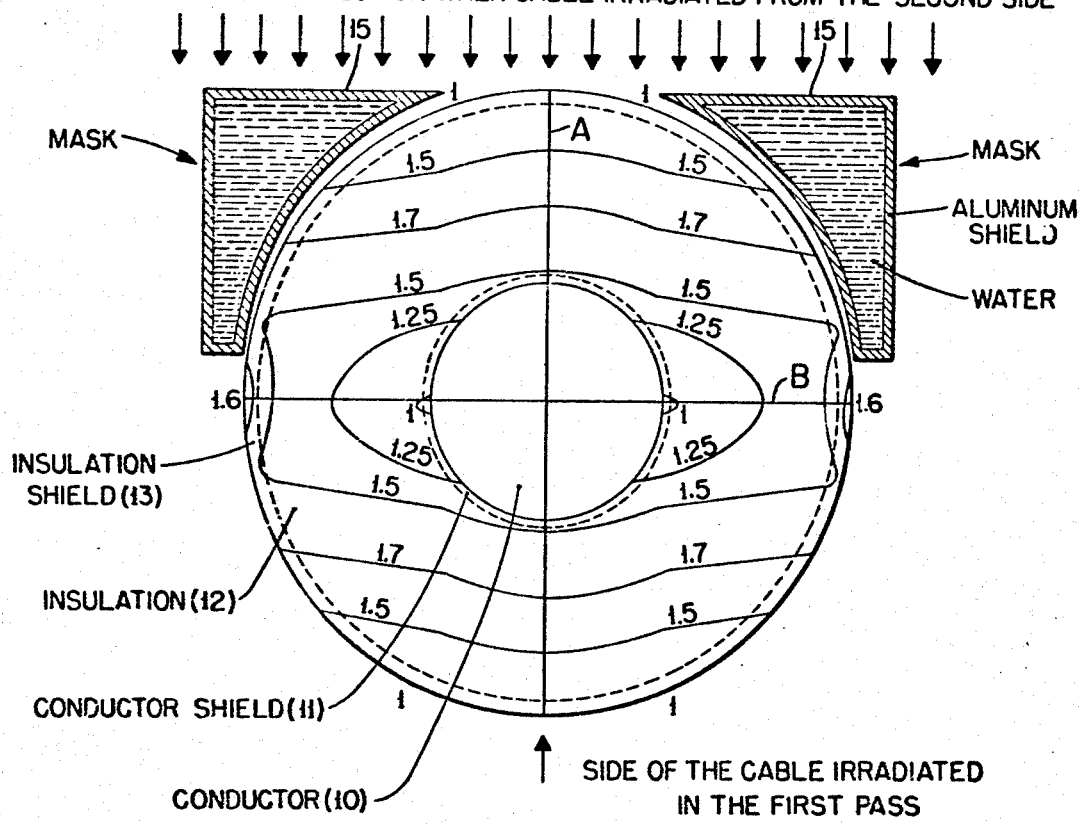

3,725,230
INSULATED ELECTRICAL CABLES AND
METHOD OF MAKING THEM
George Bahder, Edison, N.J., Oscar G. Garner, Riverside, Conn., and George S. Eager, Jr., Upper Montclair, N.J., assignors to General Cable Corporation, New York, N.Y.
Filed Mar. 29, 1971, Ser. No. 128,809
Int. Cl. B01j 1/10
U.S. Cl. 204—159.2     5 Claims

ABSTRACT OF THE DISCLOSURE

This application discloses insulated electrical cables and method of making them. The cables consist of metallic conductors, stranded or solid, a semi-conducting shield over the conductor, a comparatively heavy wall of insulation and another layer of semi-conducting shield which, if used in sufficient thickness, may serve both as a shield and an outer protective jacket. The cables are irradiated in a particular controlled manner to improve desired physical characteristics while preserving desired insulating characteristics. The invention is particularly applicable to high voltage cables rated 5 to 70 kv. or above.

BACKGROUND TO THE INVENTION

It is well known that cross-linking of polyethylene can be produced in certain ways and that such cross-linking improves the physical properties, mechanical and thermal, of insulating and semi-conducting polyethylene cable coverings or jackets which are to be subjected to temperatures above 105° C. to 110° C., which is the softening temperature of untreated low-density polyethylene. Cross-linking increases the softening point of polyethylene plastic with corresponding improvement in its desired physical properties for electrical cable service.

Cross-linking of polyethylene can be produced either chemically or by irradiation. Irradiation can be effected in different ways, including the use of an electron beam, that method being contemplated herein.

Chemical cross-linking of polyethylene coatings of power cables has certain disadvantages because a cross-linkage inducing compound, such as for example an organic peroxide, must be added to the insulating or semi-conducting shielding compounds. The disadvantage of this process is the difficulty of completely removing the decomposition products of the organic peroxides from the cross-linking insulation or shielding layers. This results in a non-homogeneous insulation with lower AC dielectric, as well as impulse strength.

The decomposition products of the most frequently used organic peroxide, namely dicumyl peroxide are acetophenone, methane, $\alpha,\alpha$-dimethylbenzyl alcohol and in the presence of carbon black-methylstyrene as shown by L. O. Amberg and W. D. Wille in their paper: a Chemical interpretation of dicumyl-peroxide vulcanization. Proceedings of International Rubber Conference, Washington, D.C., November 1959, pp. 565-574; also discussed by E. M. Dannenberg, M. E. Jordan and H. M. Cole in their paper: Peroxide cross-linked carbon black polyethylene compounds. J. Polymer Sci. 37.

In contrast to the organic decomposition products difficult to eliminate after cross-linking with organic peroxides, the only product obtained during irradiation is hydrogen, a gas soluble in polyethylene and therefore less likely to cause voids in the insulation than the decomposition products of the organic peroxides. Cross-linking of polyethylene insulation by means of irradiation does not create these problems.

There are known methods of irradiation of cables consisting of a conductor with polyethylene insulation and cables consisting of a conductor, and semi-conducting conductor shield, and extruded insulation over the conductor shield. It was found that these known methods cannot be applied to high voltage power cables for the following reasons:

(1) Irradiation of polyethylene insulation causes degradation of its surface, due mainly to oxidation effects, and consequently decreases its electrical strength. This may be tolerated for low voltage cables, but cannot be tolerated for high voltage power cables.

(2) Irradiation of a cable with an electron beam emitted from a single accelerator, which is a normal procedure causes large differences in the absorbed dose between areas of insulation which a maximum absorbed dose and areas of insulation with a minimum absorbed dose. If the areas of maximum absorbed dose in the cable insulation are properly cross-linked, then the areas of maximum absorbed dose will be insufficiently cross-linked. On the other hand, if the areas of minimum absorbed dose in the cable insulation are properly cross-linked, then the areas of maximum absorbed dose will receive excessive doses and will contain voids.

SUMMARY OF THE INVENTION

The present invention overcomes the difficulties experienced in prior practices by providing an improved cable consisting of metallic conductors stranded or solid, a semi-conducting shield over the conductor, a comparatively heavy wall of insulation and another layer of semi-conducting shield which, if used in sufficient thickness, may serve both as a shield and an outer protective jacket. An improved method of irradiating the cable assures a limit to the ratio of maximum-to-minimum dosage. For example: if the minimum dosage is given a unit value of 1.0, the maximum dosage will have a value of not more than 3.4 and preferably approximately 1.7. In the present description, the ratio will at times be expressed merely by referring to the value which is compared to the base 1.0, similarly as for specific gravity and the like.

Relative dosage may be controlled, when a single accelerator beam source is used, by screening or masking out undesired portions of the beam, as will be explained.

The invention provides a greater degree of cross-linking in the semi-conducting shield than in the insulating covering which minimizes oxidation of the insulation and provides greater resistance to heat-deformation of the treated cable in use. The relative degree of cross-linking can be determined by known test methods which determine the extractables and insolubles or solids in different zones of the cable cross-section, the zones of high linkage having less extractables and more solids than zones of low linkage. Such tests, as will be explained, show that great improvement is provided by the present invention.

BRIEF DESCRIPTION OF THE DRAWINGS

Reference will be made to the accompanying drawings which illustrate a preferred embodiment of the improved cable, preferred means for effecting the method, and comparative data, and in which:

FIG. 1 is an elevational view of an improved cable construction, layers being cut away in steps to show interior structure;

FIG. 2 is a cross section of the cable shown in FIG. 1;

FIG. 3 is a transverse section through a cable undergoing irradiation and showing relative irradiation dosages in different cross-sectional zones of the cable, the values given being those for irradiation from two opposite sides;

DESCRIPTION OF PREFERRED EMBODIMENT

Figure 4:
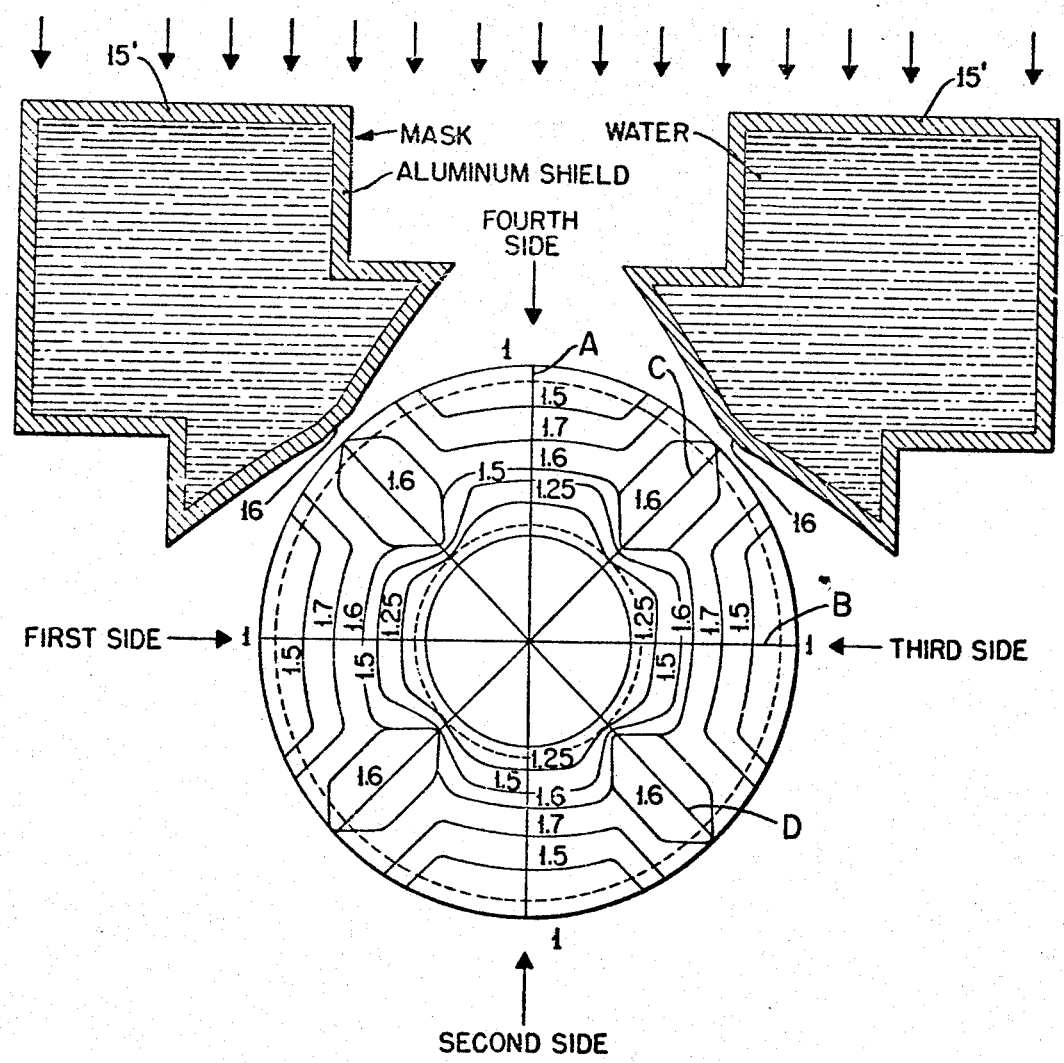
FIG. 4 is a view like FIG. 3 but showing values after the cable has been irradiated from four sides along two intersecting diameters which are normal to each other, i.e., their radii being 90 degrees apart.

Referring to FIGS. 1 and 2, a metallic conductor 10, solid or stranded, is covered by an extruded layer of semi-conducting polyethylene conductor shield 11. Over the shield 11 there is extruded polyethylene insulation 12 and finally, another layer of semi-conductor polyethylene compound as the insulation shield 13. Depending on its thickness the insulation shield 13 may serve also as an outer protective jacket.

The semi-conducting shields comprise polyethylene and an admixture which renders it conductive to the desired degree. For example: good results are obtained when 66.6% (⅔) of polyethylene resin is used in admixture with 33.3% (⅓) of FEF type carbon black and 0.1% of an antioxidant which may be a material such as 6-Tert-Butyl Meta Cresol, the polyethylene resin preferably being a copolymer of ethylene and ethyl acrylate with an ethyl acrylate content of approximately 3.5%.

The natural polyethylene insulation layer is preferably of polyethylene resin and an antioxidant resin, good results being obtained with 99.9% polyethylene resin, this being a homopolymer of ethylene, and 0.1% of an antioxidant such as 6-Tert-Butyl Meta Cresol.

Figure 5:
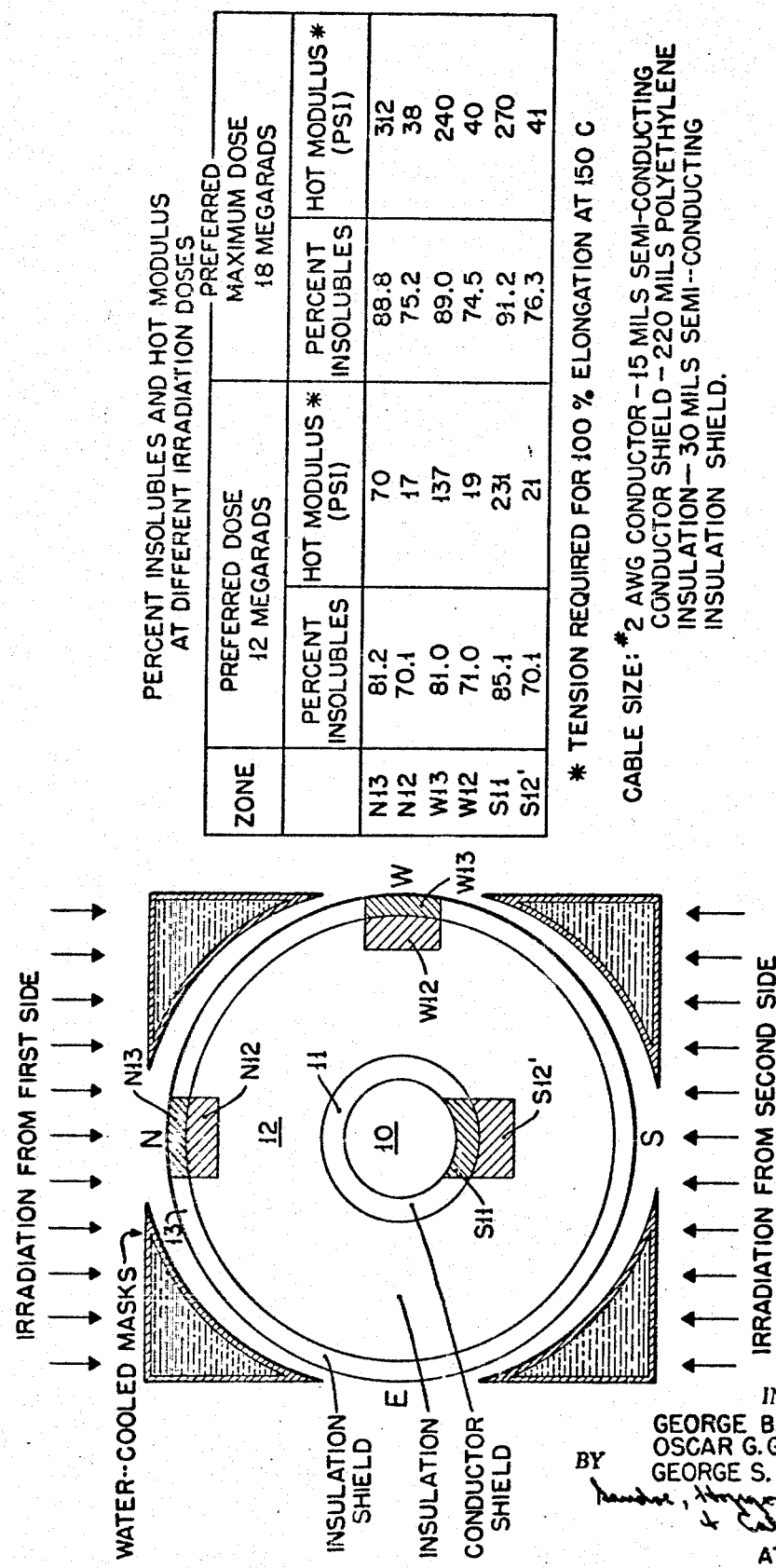
FIG. 5 is a sectional diagram and table showing percent insolubles and hot modulus for different irradiation doses in different zones.

The semi-conducting insulation shield, which contains carbon black, absorbs oxygen and thus prevents oxidation of the polyethylene insulation during and after irradiation. It is also found that irradiation cross-links the semi-conducting insulation shield and conductor shield to a significantly greater extent than the insulation. This is shown in FIG. 5 where the degree of cross-linking is indicated by the percent of insoluble material (as determined by the Decalin Extraction test) and by the results of the hot modulus test.

For convenience, the zones at the ends of the crossing diameters are designated as N, E, S, and W and the cable coverings by their applied reference characters. Thus at zone N13 in the semi-conducting shielding 13, the percent insolubles and hot modulus are higher than in the adjacent conductor zone N12. The same is true at W13 as compared to W12; and also at S11 as compared to S12'. In all cases the solid additives, such as carbon black, etc., have been deducted in order to show a proper comparison of insolubles due to cross-linking.

A higher degree of cross-linking of the conductor shield and the insulation shield is a very desirable feature for high voltage power cables because at elevated temperatures, these shields will act as a shell for the polyethylene insulation and will thus improve the mechanical properties of the cable.

Furthermore, it is found that good performance of high-voltage power cable is obtained when the absorbed dose in the insulation is in the range of 10 to 20 megarads and the ratio of maximum to minimum dose is approximately 1.7 (i.e., 1.7 to 1.0).

Data concerning the properties of irradiated polyethylene insulation which indicate the proper dose range and the influence of the ratio of maximum-to-minimum absorbed dose are given in Table I below. This was compiled for a cable having a #2 AWG conductor; a 15 mil thick semi-conducting shield; a 220 mil thick polyethylene insulation; and a 30 mil semi-conducting insulation shield.

TABLE I

Effect of Absorbed Dose on Percent Insolubles and Void Formation in Insulation Layer

| Sample No. | Megarads | | Dose ratio | Percent insolubles | | Voids in insul. |
| | Min. dose | Max. dose | | Region of min. dose | Region of max. dose | |
| --- | --- | --- | --- | --- | --- | --- |
| 1 | 8 | 14 | 1.7 | 40 | 70 | None. |
| 2 | 10 | 17 | 1.7 | 61 | 75 | Do. |
| 3 | 12 | 20 | 1.7 | 70 | 78 | Do. |
| 4 | 15 | 25 | 1.7 | 74 | 80 | Do. |
| 5 | 18 | 31 | 1.7 | 77 | 82 | Few voids which later disappeared. |
| 6 | 24 | 41 | 1.7 | 80 | 88 | Many voids. |
| 7 | 10 | 34 | 3.4 | 55 | 83 | None. |
| 8 | 12 | 41 | 3.4 | 68 | 89 | Few voids which later disappeared. |
| 9 | 15 | 51 | 3.4 | 74 | 92 | Many voids. |

NOTE.—Specimen cable: #2 AWG conductor; 15 mil semi-conducting conductor shield; 220 mil insulation; 30 mil semi-conducting insulation shield.

These thin semi-conducting shields (shown much out of relative scale in the drawings) are somewhat difficult to apply properly by ordinary means but are readily applied by the apparatus and method disclosed in the patent to Garner, 3,229,012, granted Jan. 11, 1966, and according to the pending Garner Application U.S. Ser. No. 514,933.

From Table I it appears that the percent insolubles, which is a measure of cross-linking, is very small in cables irradiated with a dose of 8 megarads and such cables may not perform well. The 55% to 60% insolubles obtained at a dose of 10 megarads may be considered a minimum. With a maximum dose of 18 megarads and a maximum-to-minimum dose ratio of 1.7, the percent of insolubles is high; but under these conditions a few voids, which later disappeared, were present in the cable insulation immediately after irradiation. This dose may therefore be considered as the highest usable dose for the cable construction discussed. At a maximum-to-minimum dose ratio of 3.4 voids may appear at a minimum dose as low as 12 megarads.

In order to insure that the maximum-to-minimum dose ratio in the cable will not exceed the desired amount of 1.7, as found above, the present invention provides that part of the cable cross-sectional area shall be shielded or masked, here on the outer sides, as by water-cooled masks 15, opaque to electron beams, as shown in FIGS. 3 and 4.

FIG. 3 shows dosage values by zones when a partially masked cable has been irradiated from two sides or opposite ends of a given diameter A, the masks being located at a distance on opposite sides of this given diameter A so as to reduce the irradiation ratio at the lateral sides of the cable, that is, at the opposite ends of a transverse diameter B which is at right angles or normal to the given diameter A in the line of the beam direction. The masks vary from very thin on the inner sides to very thick on the outer sides, the inner surface being arcuate and generally parallel to or concentric with the outer circumference of the cable. The shape, character and position of the masks are such that the relative absorbed dose at two passes (half the dose at each pass) measured along the normal transverse diameter B is 1.0 at the conductor shield 11 and 1.6 at the insulation shield 13. In intermediate zones on each side in quadrants and along transverse isobars the relative absorbed dose increases to the maximum of 1.7, decreasing in all directions therefrom.

Figure 6:
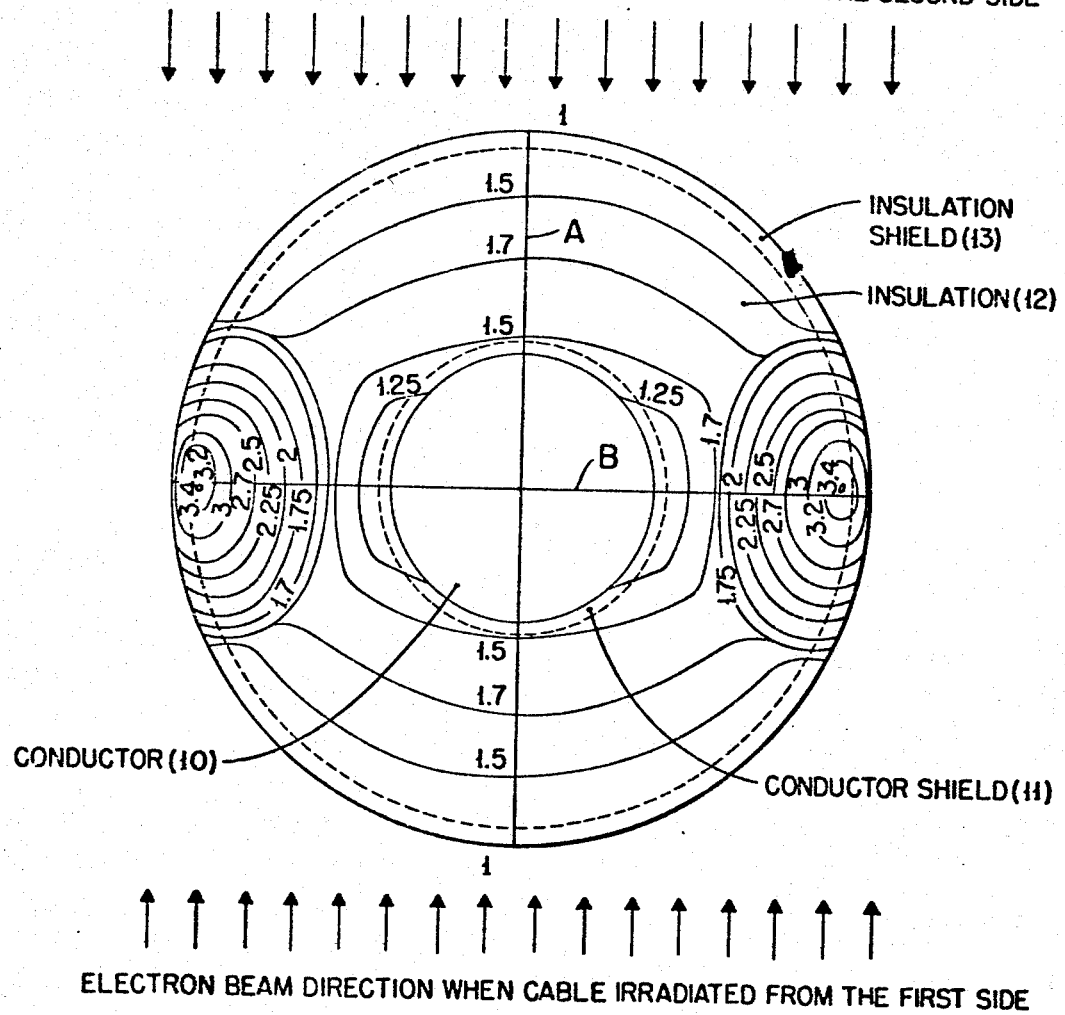
FIG. 6 is a view similar to FIG. 3 but showing the distribution pattern and dosage values for a cable having a semi-conductive outer insulation shield but irradiated uniformly across its entire sectional width, that is, without partial shielding masks, as contemplated by the present invention.

FIG. 6 shows by comparison what the zone pattern and values are when beam masking is not used. Here the relative absorbed dose near the outer ends of the normal transverse diameter B rise to 3.4 for two passes from opposite sides.

FIG. 4 shows dosage values by zones when a partially masked cable is irradiated from four sides at opposite ends of mutually normal diameters A and B. Here the masks 15' are located at a distance on each side of the beam-aligned diameter, as before, and are relatively thicker on the outer lateral sides, as before, but the inner surface is near and parallel to the cable circumference only at the intermediate point 16, sloping away from the cable circumference on each side of the intermediate proximal point 16. The cross-sectional shapes and positions of the masks are made such that irradiation of the cable from one side at one pass provides a relative absorbed dose on diameters C and D, which are inclined at 45 degrees to the beam diameter A and normal diameter B, which varies from 0.5 to 0.8, the cable after irradiation from the four sides under these conditions having a maximum-to-minimum dose which does not substantially exceed the desired ratio of 1.7. The zones of maximum dose now lie along four "isobars" or lines of equal value crossing the irradiation diameters A and B and extending into four quadrants between them.

The masks may be made of thin aluminum sheet about 5 mils thick which are strengthened outside the beam or cable width and cooled by fluid such as water to keep the masks near room temperature.

It is believed to be unnecessary to show how a travelling cable is passed over sheaves to reverse its direction and present different sides to irradiation in a common plane for equal treatment at each pass since this, per se, is well known in the art.

The cable may be irradiated as it is formed or may be wound on reels and elsewhere or later be taken therefrom for irradiation. If taken directly from the extrusion equipment on which one or all of the coatings were applied, it is usually necessary to cool the cable down to about room temperature before it is irradiated; and it is also important to cool the cable after irradiation, that is, between passes, if it is given more than one treatment before being wound upon a reel. It is desirable to keep the maximum temperature of the cable below 95° C. at all times to avoid injury of the insulation.

If the accelerator voltage is sufficiently high the two-pass treatment of FIG. 3 instead of the four-pass treatment of FIG. 4 will be used. When the accelerator voltage is such that it can be adjusted to provide a relative absorbed dose of 0.5 at the conductor shield on the cable axis perpendicular to the beam direction, the cable may be irradiated from two sides. When the accelerator voltage is smaller and a relative absorbed dose of only 0.5 can be obtained at the conductor shield on the cable axis being in inclined position at 45 degrees to the beam direction, the cable must be irradiated from four sides.

Table II herebelow gives the required accelerator voltage for various cable sizes, the table taking into account the electron back scattering effect which appears at the conductor 10 of the cable.

As an alternative to the above-described method of producing all cross-linking after the cable has been fully formed, it would be permissible to cause cross-linking in steps as the cable is formed, the first step by cross-linking by irradiation after the interior semiconductive shield 11 has been applied (assuming that it is used) and the last step by irradiation of the final cable structure.

It is thus seen that the invention provides an improved cable with irradiated polyethylene insulation and a semiconductive polyethylene protective shield therefor which inhibits injury to the insulation during irradiation and in service, the protective shield being cross-linked to a greater degree than the insulation and the ratio of maximum-to-minimum cross-linking dosages being within predetermined limits; also that an improved method of making the cable is provided whereby the water-cooled masks protect the insulation and assures the proper ratio of cross-linking, particularly when selective masking of the cross-section of the cable is employed.

One embodiment and certain modifications of the invention have been described for purposes of illustration, and the invention is denfied in the appended claims.

What is claimed is:

1. The method of making an insulated electrical cable which is especially suitable for high voltage alternating current use, which comprises providing a cable structure which includes a metallic conductor with a semi-conducting inner shielding covering, polyethylene insulating covering surrounding the inner shielding covering, and an outer semi-conductive polyethylene shielding covering, the coverings being applied in a non-irradiated condition, and then irradiating the cable structure to produce cross-linking simultaneously in the polyethylene insulating and both shielding coverings and with the outer shielding covering protecting the inner insulating covering from oxidation, surface degradation and interior voids, and controlling the irradiation, so as to keep the maximum-to-minimum zone irradiation dosage ratio below about 3.4 to 1.0, by locating sources of radiation over different angularly spaced regions around the circumference of the cable and applying parts of the radiation dosage from said different regions around the cable.

2. The method as set forth in claim 1, further characterized by controlling the irradiation to limit the maximum-to-minimum dose ratio throughout the covering to the point where, when the minimum dosage zones have been cross-linked to the desired degree, the maximum dosage zones have not been subjected to excessive injurious irradiation.

3. The method as set forth in claim 2, further characterized by the maximum-to-minimum dosage ratio being kept to a limit of about 1.7 to 1.0.

TABLE II.—REQUIRED ACCELERATOR VOLTAGE IN MV. FOR VARIOUS CABLE SIZES

| | Insulation thickness, mil | | | | | | | | | |
|---|---|---|---|---|---|---|---|---|---|---|
| | 110 | | 220 | | 345 | | 390 | | 630 | |
| | Rating, kV. | | | | | | | | | |
| | 5 | | 15 | | 35 | | 40 | | 69 | |
| Irradiated from (sides) | 2 | 4 | 2 | 4 | 2 | 4 | 2 | 4 | 2 | 4 |
| Conductor size: | | | | | | | | | | |
| 4 AWG | 1.33 | 0.95 | 1.96 | 1.56 | 2.66 | 2.23 | 2.98 | 2.49 | 4.20 | 3.77 |
| 2 AWG | 1.42 | 0.97 | 2.07 | 1.58 | 2.77 | 2.26 | 3.01 | 2.51 | 4.32 | 3.81 |
| 1/0 | 1.54 | 0.97 | 2.20 | 1.60 | 2.93 | 2.29 | 3.14 | 2.56 | 4.50 | 3.86 |
| 4/0 | 1.75 | 1.01 | 2.47 | 1.65 | 3.20 | 2.34 | 3.48 | 2.61 | 4.82 | 3.94 |
| 300 MCM | 1.94 | 1.08 | 2.68 | 1.73 | 3.43 | 2.45 | 3.69 | 2.70 | 5.05 | 4.02 |
| 500 MCM | 2.15 | 1.12 | 2.93 | 1.77 | 3.73 | 2.52 | 4.02 | 2.77 | 5.32 | 4.09 |
| 750 MCM | 2.36 | 1.14 | 3.18 | 1.80 | 3.98 | 2.56 | 4.30 | 2.80 | 5.75 | 4.15 |
| 1,000 MCM | 2.51 | 1.44 | 3.37 | 2.13 | 4.21 | 2.87 | 4.53 | 3.14 | 6.00 | 4.46 |

During irradiation it is desirable to limit the cable temperature at all times below a maximum of about 95° C. For a minimum absorbed dose above 12 megarads, double irradiation from two directions is required.

4. The method as set forth in claim 2, further characterized by the dosage over the cross-sectional area of the cable being controlled by locating masking means between the source of irradiation and the cable over portions of the circumference of the cable.

5. The method as set forth in claim 4, further characterized by locating said masking means on opposite sides of the diameter of the cable which is aligned with the direction of beam application to the cable and applying parts of the dosage from different sides of the cable.

References Cited

UNITED STATES PATENTS

| | | | |
|---|---|---|---|
| 3,269,862 | 8/1966 | Lanza et al. | 117—93.31 X |
| 3,259,688 | 7/1966 | Towne et al. | 174—127 X |
| 3,325,325 | 6/1967 | Ward | 174—110 PM X |
| 3,084,114 | 4/1963 | Gilbert et al. | 174—110 PM UX |
| 2,929,744 | 3/1960 | Mathes et al. | 117—218 |
| 3,441,660 | 4/1969 | Garner | 174—110 PM X |

FOREIGN PATENTS

| | | | |
|---|---|---|---|
| 1,103,098 | 2/1968 | Great Britain | 174—102 SC |
| 766,802 | 1/1957 | Great Britain | 264—22 |

OTHER REFERENCES

W. Brenner: Commercial Implications of Radiation Processing of Plastics, Modern Plastics, April 1968, pp. 116–118, 120.

BERNARD A. GILHEANY, Primary Examiner

A. T. GRIMLEY, Assistant Examiner

U.S. Cl. X.R.

117—93.3, 218; 174—36, 110 PM, 120 SC; 264—22